Oct. 25, 1932.   H. D. HIVELY ET AL   1,885,099
GLASS CUTTING MACHINE
Original Filed July 19, 1928   4 Sheets-Sheet 1
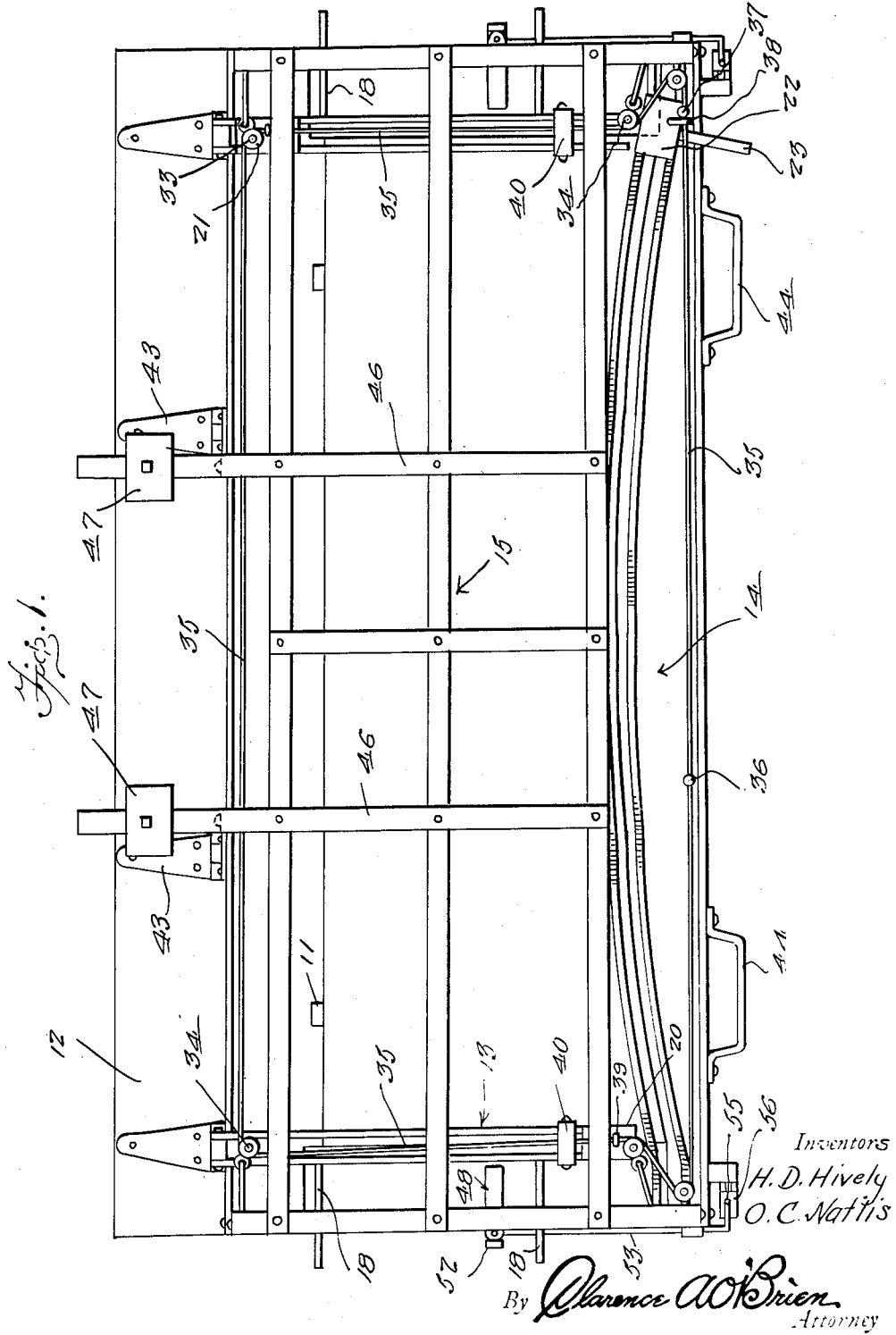
Inventors
H. D. Hively
O. C. Nattis
By Clarence A. O'Brien
Attorney

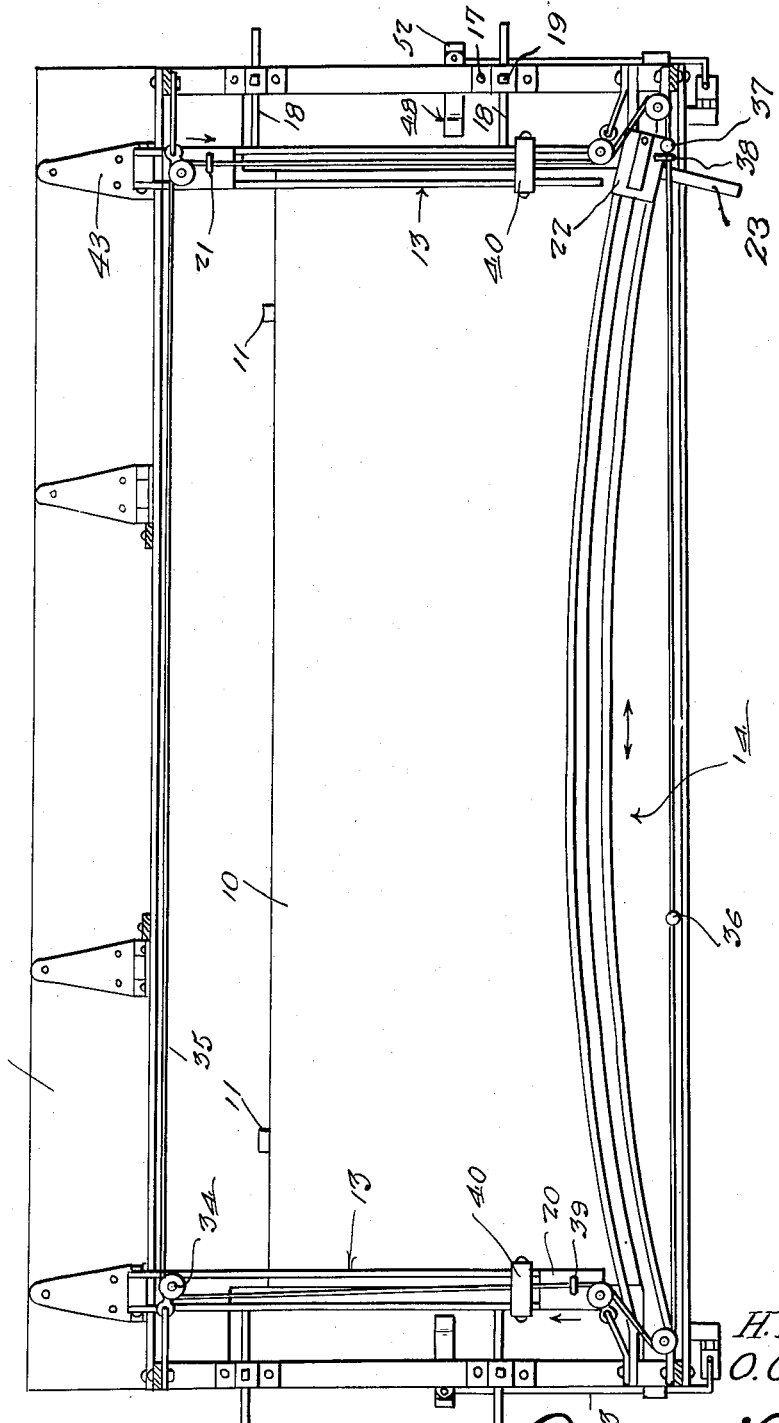

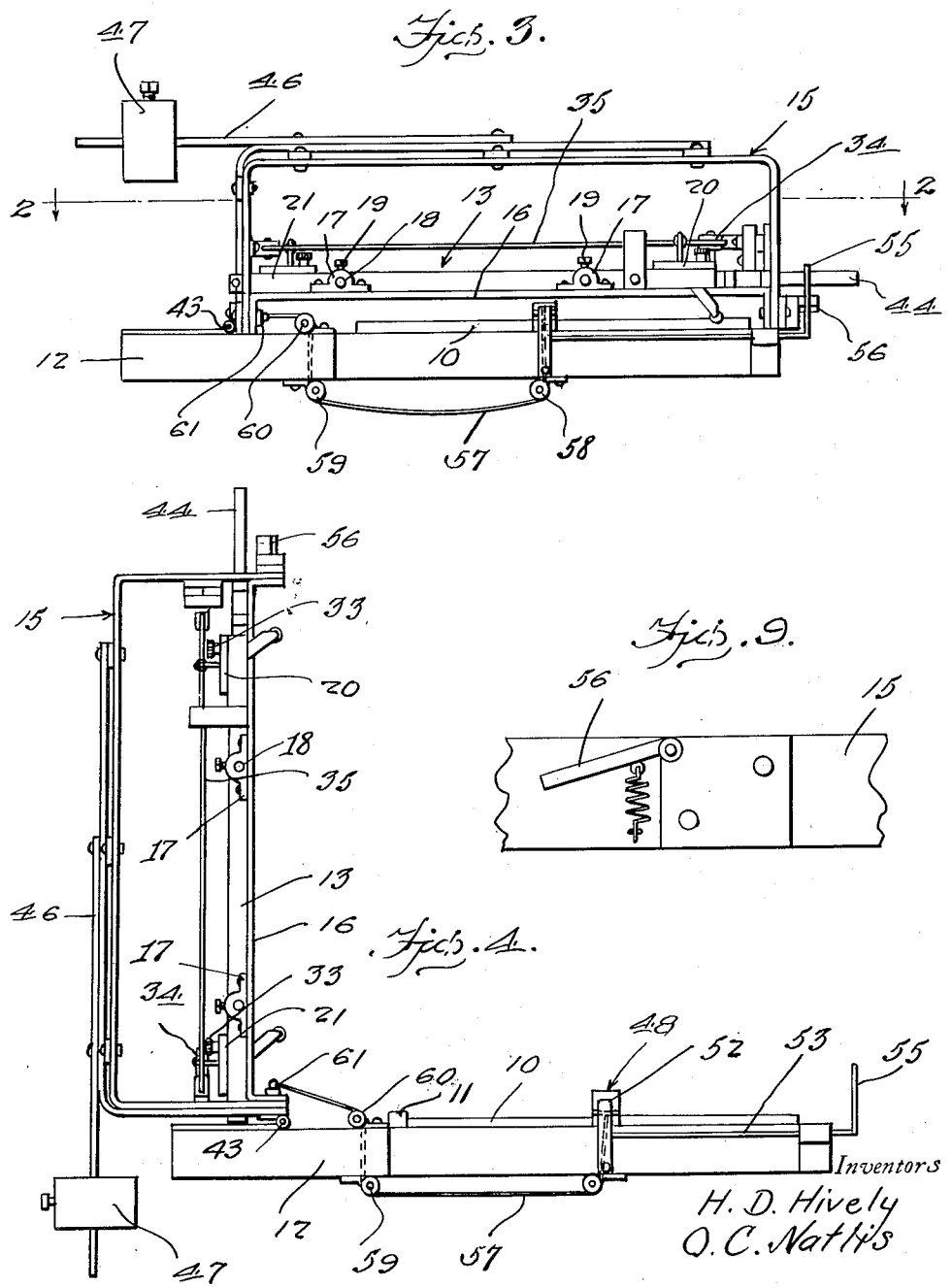

Oct. 25, 1932.  H. D. HIVELY ET AL  1,885,099
GLASS CUTTING MACHINE
Original Filed July 19, 1928   4 Sheets-Sheet 4
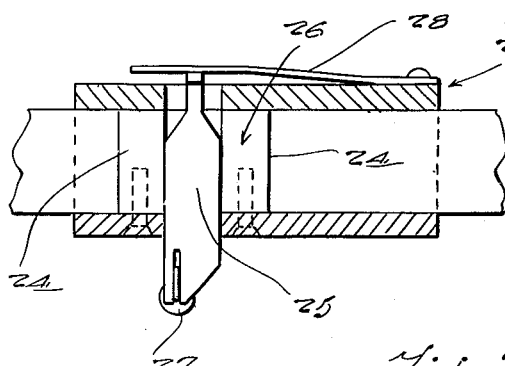
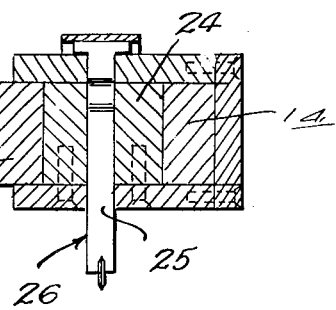
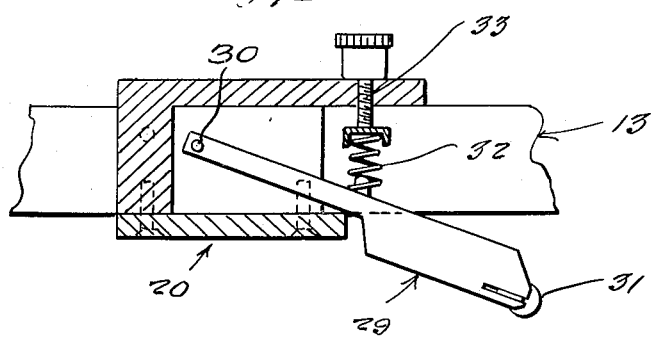
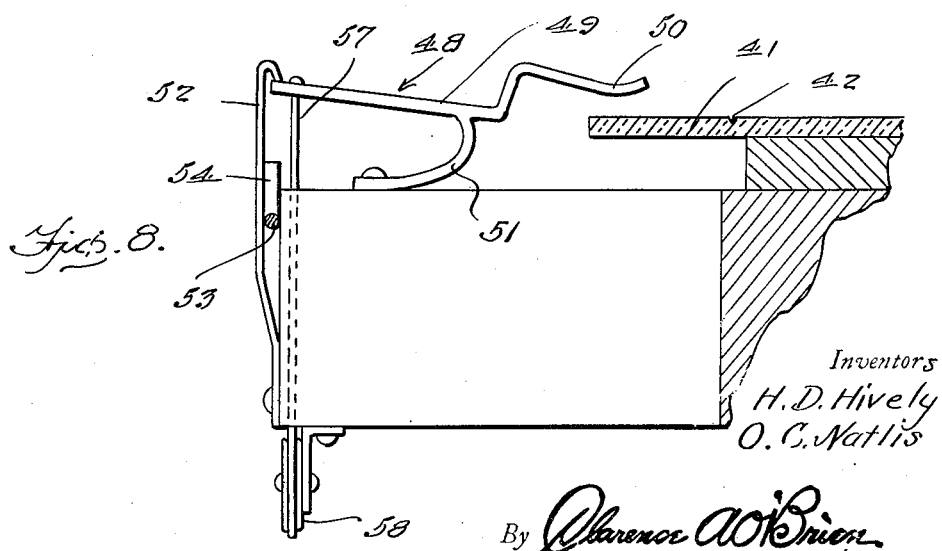
Inventors
H. D. Hively
O. C. Natlis
By Clarence A. O'Brien
Attorney Patented Oct. 25, 1932

1,885,099

UNITED STATES PATENT OFFICE

HOWARD D. HIVELY AND OCTAVE C. NATLIS, OF CHARLESTON, WEST VIRGINIA, ASSIGNORS TO LIBBEY-OWENS-FORD GLASS COMPANY, OF TOLEDO, OHIO, A CORPORATION OF OHIO

GLASS CUTTING MACHINE

Application filed July 19, 1928, Serial No. 294,022. Renewed March 2, 1932.

This invention relates to the broad class of glass cutting, and has more particular reference to that sub-division, covering glass cutting machines for hard glass, the invention being particularly, but not necessarily, designed for cutting plate glass used in the making of automobile windshields.

At the present time, so far as we know, it is the common practice to cut windshields with hand manipulated glass cutting instruments. It is usually the practice to provide a suitable supporting table, and to place on this table, a pattern board, having the shape of the finished product. Then the operator draws the cutting instrument along the edges of the pattern board, and thereafter takes his hammer or other device, to break the scored edge portions of the glass plate off. Although this method has been followed with success for many years, it is nevertheless tiresome, crude, inaccurate, and requires the services of a skilled glass cutter.

The purpose of the present invention is to provide an appropriately designed machine which will simultaneously cut all of the desired edges of the glass plate into proper shape, and thus subsequently break off the edge portions.

A machine of this type will decidedly increase the output, and will permit the break to be accomplished by substantially unskilled hands.

More specifically stated, the invention contemplates the provision of a table, a stationary pattern board which is arranged thereon, and a series of cutting element carriers properly arranged for simultaneous cutting operation.

The particular details and their specific association and relative arrangements will become more readily apparent in the following detailed description and the accompanying drawings.

In the accompanying drawings in which like numerals are employed to designate like parts throughout the same:

Figure 1 is a top plan view of a glass cutting machine constructed in accordance with the present invention.

Figure 2 is a horizontal sectional view throughout the same, the section being approximately on the plane of the line 2—2 of Figure 3.

Figure 3 is an end view of Figure 1.

Figure 4 is a view similar to Figure 3 showing the frame-like guard swung up to a position to expose and permit removal and subsequent placement of a windshield.

Figure 5 is a sectional and detail view of one of the cutter carriers.

Figure 6 is a view at right angle to Figure 5.

Figure 7 is a similar view of another one of the cutter carriers.

Figure 8 is an exaggerated detail sectional end elevational view, of one of the devices for breaking the scored edge portion of the glass plate.

Figure 9 is a fragmentary elevational view of an operating device for a latch strip.

Referring now to the drawings by numerals it will be observed that reference character 10 designates the pattern board. This is of a configuration corresponding to the shape of the windshield to be cut. The particular type herein shown is for that type of windshield embodying three straight edges and one longitudinally curved edge. Incidentally the glass plate on this pattern board has one straight edge up against upstanding stops 11 carried by the base 12. This base may be in the form of a table top or the like and the pattern board is rigidly mounted thereon.

The next details of importance to note are the tracks. There are three of these tracks, two end tracks 13 and one curved track 14. The end tracks are straight and extend along the ends of the pattern board and just above the terminal edges of said ends. The curved track 14 corresponds with the correspondingly shaped edge of the pattern board front. Moreover, the tracks 13 extend at substantially right angles to the track 14. These tracks are supported from the base in such a manner as to permit them to be brought down into position for operation quickly and then removed away from the pattern board to permit removal of the finished product and placement of the next piece of glass to be cut.

Any suitable sort of a mounting may be employed for this purpose but we have shown for sake of illustration a frame-like guard 15. This embodies U-shaped members connected together by spaced bars forming an open framework structure. The end members of the frame guard carry bottom bars 16 which in turn carry bearing brackets 17 receiving the ends of shafts 18 held in place by set screws 19. These shafts 18 are connected with the end tracks whereby these tracks are bodily adjustable to permit them to be regulated for accurate cutting. Any other appropriate means for regulating these tracks however may well be employed in practice.

Attention is next invited to the cutter carrying means. By preference we employ three block like carriers 20, 21 and 22, respectively. These are slidably mounted on the tracks and the cutters 20 and 21 are mounted on the end tracks 13 while the one designated at 22 is on the curved track 14. Incidentally this carrier has an outstanding handle 23 for operating it.

The front cutter is of the construction shown in Figures 5 and 6. Referring to these figures it will be observed that it is of hollow box-like construction and is provided with spaced guide members 24 between which the shank portion 25 of the cutting tool or implement 26 is mounted. This cutting implement includes the usual cutting or scoring disk 27 and the shank portion extends up to an opening in the top of the carrier where it engages a tensioning spring 28. This cutter is vertical with respect to the surface of the glass to be cut.

Each end carrier 20 or 21 as the case may be is of the construction shown in Figures 7. Again the carrier is of hollow box-like construction and in this instance the tool 29 has its shank portion pivotally mounted as at 30 and it is disposed in an angular position at the approximate angle shown and this holds the cutting disk 31 in a proper position for scoring the end portions of the glass. The shanks of the tools in this instance have a projection received in one end of a coiled spring 32 adjustable through the medium of a bolt 33.

We next invite attention to a series of pulleys 34 arranged in the corner portion of the guard frame. These accommodate an endless cable or the like 35 which is trained thereover. The forward stretch of the cable is provided with ball-like projections 36 and 37 at longitudinally spaced points and the carrier 22 has an eye 38 mounted thereon which cooperates with this forward stretch and has successive abutting engagements with these projections 36 and 37. The end carriers 20 and 21 are fastened as at 39 to the corresponding portions of the cables and these travel through the bracing arches 40. It is to be noted that when the carrier 22 is at the end of the track shown in Figure 2 the carrier 21 is at the forward end of one track 13 while the carrier 22 is at the opposite end thereof. It is necessary that the carrier 22 have some movement in advance of the carriers 20 and 21 since it must travel over a greater distance than the carriers 20 and 21. This is the reason for providing the eye bolt 38 and the two projections 36 and 37 which cooperate therewith. With this arrangement it is obvious that the carriers 20 and 21 and their respective cutting tools are movable in direction opposite to each other as indicated.

Normally the carrier 22 is at the left hand end of the track 14 starting the cutting operation. This places the abutment 37 at about the center of the track and the abutment 36 at the extreme left hand end of the track. Then by grasping the handle 23 and moving this carrier across the edge of the glass, the eye bolt 38 comes into engagement with the abutment 37. Up to this time the carriers 20 and 21 have not moved. However, further motion of this carrier 22 serves to start the cable to move around the pulleys and does move the carriers 20 and 21 at opposite directions to cross the end portions of the glass thus completing the scoring operation in proper timed relation. Incidentally in Figure 8 the reference character 41 designates the glass plate, 42 the score line. It is also obvious that when the carrier 22 is returned it also returns the other carriers 20 and 21 to their respective starting position.

Attention is next invited to the fact that the guard frame is mounted upon the base through the medium of hinges 43 and the forward portion is provided with hand grips 44 whereby it can be swung up from the base and from the position shown in Figure 3 to the position shown in Figure 4. In this connection it is to be noted that the frame carries arms 46 having adjustable counterbalancing weights 47 to facilitate this lifting and swinging motion of the frame. Obviously, the purpose of this movement is to uncover the glass to permit the cut glass to be removed from the pattern board and to permit another glass plate to be placed in position for the next cutting operation.

It is desirable to provide means for automatically breaking or cracking the scored edge portions of the glass plate as the same is lifted and we have accomplished this by a pair of devices of the type shown in Figure 8. Referring to this figure it will be seen that the reference character 48 designates generally an impact element. This comprises an arm 49 having a suitably shaped hammer portion 50 and spring 51. The tendency of the spring is to normally move the hammer downwardly to strike and break the edge portion of the glass off. It is necessary, however, to hold this device 48 normally in an ineffective position. This is done by way of a hooked latch 52, the hook portion of which engages over the device 48 as shown. The latch, however, must be disengaged at the proper time. This movement of the latch is accomplished by an oscillatory rock shaft 53 operating as a trip and having an upstanding finger 54 engageable behind the latch as shown. The opposite end of this rock shaft is formed into an arcuate portion 55 standing beyond the front edge of the base and this is in turn cooperable with spring-pressed actuating member 56 as detailed in Figure 9. The member 56 is carried by the frame. Obviously, then if the frame is lifted up the part 56 engages the part 55 thereby rocks the trip shaft and moves the finger 54 against the latch 52 and disengages the latch to allow the device 48 to come automatically into play at the proper time. However, there must also be automatic means for resetting the latch and the device 48 to hold it normally in the position shown in Figure 8. This may be accomplished by the use of a pull cord 57 which is connected to the outer swingable end of the arm 49 and extends down through an opening in the base board where it is trained over a pulley 58 then over a second pulley 59 and over a third pulley 60 with the end anchored as at 61 to the hinged end portion of the frame 15 as shown in Figure 3. Thus, as the frame is lifted up an endwise pull is exerted upon this cord and this pulls down on the arms 49 which is now in a position underneath of the hooked end of the latch 52. The result is that when the frame is swung down again the latch again comes into play to hold the device 48 in the position shown in Figure 8.

It is apparent that normally the guard frame 15 is down on the base board as shown in Figures 1 and 3 and that it is intended to be swung up from this position to the position shown in Figure 4. Assuming, that a plate of glass has been placed on the pattern board in proper position and that the frame is down as shown in Figures 1 and 2 the operator catches hold of the handle 44. At this time the carrier 22 for the front track 14 is at the extreme left hand end of this track and as before stated as it is moved to about the center of the track it comes into cooperative relation with the ball 38 and begins to move the cable. This in turn moves the end carriers and thus all of the cutting tools are drawn simultaneously across the edge portions of the glass to be scored in an obvious manner. Now, to remove the glass the frame is lifted up and in so doing the trip is automatically actuated to release the latch to allow the breaker to come into play as definitely described. Then when the frame is again lowered the breaker is set in tensioned position for the next operation.

The gist of the invention as before implied is in the provision of the plurality of tracks appropriately arranged with respect to the edge portions of the pattern board and the carriers which are simultaneously movable across these tracks for scoring the glass together with the automatic means for breaking the glass. It is thought, however, that by considering the detailed description in connection with the drawings a clear understanding of the construction, operation and advantages will be had. Therefore, a more lengthy description is regarded unnecessary.

Minor changes in shape, size and the arrangement of parts coming within the field of invention claimed may be resorted to if desired.

Having described our invention, what we claim as new is:—

1. A windshield glass cutting machine of the class described comprising a base, a pattern board on the base, a frame hingedly mounted on the base and disposed over the pattern board, a series of tracks carried by the frame, a plurality of cutting tools mounted for sliding movement along the tracks, and means for simultaneously sliding the cutting tools.

2. A windshield glass cutting machine of the class described comprising a base, a pattern board on the base, a guard frame hingedly mounted on the base and adapted for disposition over the pattern board, a curved track carried by the frame at its front, a pair of tracks also carried by the frame at its ends and extending substantially at right angles to the front track, carriers slidably mounted on said tracks respectively, cutting tools mounted on the carriers, pulleys on the frame, and a cable trained over said pulleys and having connection with said carriers.

3. A windshield glass cutting machine comprising a base, a pattern board on the base, said board having certain straight edges and a curved edge, a plurality of cutting tools mounted above and movable toward and away from the pattern board to provide for the placement and removal of the glass, means for simultaneously actuating the cutting tools, means for guiding said tools to effect the scoring of the glass along lines corresponding to and adjacent the respective straight and curved edges of the pattern board, and means for subsequently breaking the scored end portions of the glass.

4. A windshield glass cutter of the class described comprising a base, a pattern board on the base, a frame swingably mounted on the base and swingable over the pattern board, a series of tracks carried by the frame, a series of carriers slidably mounted on the tracks, cutting tools on the carriers, spring actuated breaking devices adjacent the end portion of the respective tracks, retaining devices for the breaking devices, and operatively connected with said latter devices.

5. A windshield glass cutter of the class described comprising a base, a pattern board carried by the base, a frame, tracks carried by the frame, means for pivotally mounting the frame on the base in operative relation to the pattern board for movement toward or away from said board and the tracks carried by the frame adapted to extend along certain edges of the pattern board, cutting tools slidably mounted on said tracks, and means for simultaneously actuating the cutting tools.

6. A windshield glass cutting machine of the class described comprising a stationary pattern board, a support for the board, said board having certain straight edges and a curved edge, a plurality of individual tracks, there being a curved track and a pair of straight tracks, the said straight tracks adapted to extend along certain of the straight edges of the board, and the curved track along the curved edge of the board, and a cutting tool slidably mounted on each of said tracks.

7. A windshield glass cutting machine of the class described comprising a stationary pattern board, a support for the board, said board having certain straight edges and a curved edge, a plurality of individual tracks, there being a curved track and a pair of straight tracks, the said straight tracks adapted to extend along certain of the straight edges of the board and the curved track along the curved edge of the board, and a cutting tool slidably mounted on each of said tracks, means for mounting said tracks in operative relation to the pattern board whereby said tracks may be moved simultaneously toward or away from said board as and for the purpose specified.

8. In a structure of the class described, a base, a pattern board carried by the base, a frame hingedly mounted on the base, tracks carried by the frame, carriers slidably mounted on the tracks, tools on the carriers for scoring the glass, glass breaking means on the base, latches for retaining said means in inoperative position, trips on the base cooperable with the latches, and means operatively connecting the frame and said trips, for controlling actuation of the breaking means by the swinging movement of said frame.

9. A glass cutting machine including in combination a base for accommodating the work, a guard frame hingedly mounted on the base for swinging movement toward and away from the base, glass cutting means carried by said frame for movement therewith, arms mounted on the frame, adjustable counter-balance weights on said arms and a glass breaking device operatively mounted with respect to the work, trip means for normally retaining the breaking device out of engagement with the work, and means for releasing said trip when the frame is swung upwardly.

10. In a structure of the class described, a base, means for supporting a plate of glass on the base, glass breaking means carried by the base and cooperable with said first mentioned means for removing certain edge portions of the glass, said last mentioned means comprising a spring arm adapted to strike against the glass adjacent one edge of the glass, a hooked latch cooperable with the arm, a rock shaft mounted for rocking movement on the base and including a trip finger cooperable with the latch for releasing the latch whereby said arm may be actuated for breaking contact with the glass, and means for actuating the rock shaft.

11. In a structure of the class described, a pattern board, said board being adapted to receive thereon a plate of glass of an area greater than the glass, a glass cutting tool, means for operatively mounting the tool on the base in operative relation to said board, means for operating the tool for scoring the glass along certain edges of the glass at the adjacent edges of the pattern board, a spring pressed arm, means for operatively mounting the arm in operative relation to the said board for contact with the scored edges of the glass for breaking off said scored edges, along the said edges of the board, means for actuating said arms, and means for maintaining said arm in an inoperative position, whereby the glass may be removed or placed upon said board.

12. In apparatus for cutting glass sheets or plates, means for supporting the sheet to be cut, a plurality of tracks mounted above the supporting means, said tracks extending in different directions relative to one another, a cutting tool carried by and movable along each track, means for moving one of the cutting tools along its respective track to effect scoring of the glass sheet along a predetermined line of cut, and means actuated by the cutting tool but only after the said tool has partially completed its cutting stroke for causing the simultaneous movement of a second cutting tool along its respective track to effect the scoring of the sheet along a second predetermined line of cut which is non-parallel to the first line of cut.

13. In apparatus for cutting glass sheets or plates, means for supporting the sheet to be cut, a plurality of tracks mounted above the supporting means and extending in different directions, said tracks including a relatively long curved track and a relatively shorter straight track, a cutting tool carried by and movable along each track, means for moving the cutting tool along the curved track to effect scoring of the glass sheet along a predetermined line of cut, and means actuated upon movement of said cutting tool but only after the said tool has partially completed its travel along said curved track for causing the simultaneous movement of a second cutting tool along the relatively shorter straight track to effect scoring of the sheet along a second predetermined line of cut which is non-parallel to the first line of cut.

14. In apparatus for cutting glass sheets or plates, a table for supporting the sheet to be cut, a plurality of cutting tools mounted above the table, a plurality of guide members, one being provided for and supporting each cutting tool, said guide members being arranged at an angle relative to one another, and means for moving said cutting tools simultaneously along said guide members to effect the scoring of the glass sheet along non-parallel lines.

15. In apparatus for cutting glass sheets or plates, means for supporting the sheet to be cut, a plurality of guide members mounted above the supporting means, said guide members extending in different directions relative to one another, a cutting tool carried by and movable along each guide member, means for moving one of the cutting tools along its respective guide member to effect the scoring of the glass sheet along a predetermined line of cut, and means operated by movement of said cutting tool for causing the simultaneous movement of a second cutting tool in a different direction along a second guide member to effect the scoring of the sheet along a second predetermined line of cut which is non-parallel to the first line of cut.

In testimony whereof we affix our signatures.

HOWARD D. HIVELY.
OCTAVE C. NATLIS.